May 16, 1933.    M. FLEISCHER    1,909,339
SOUND SYNCHRONIZED ANIMATED DRAWING FILM AND PROCESS OF PRODUCING SAME
Filed July 23, 1930    2 Sheets-Sheet 1
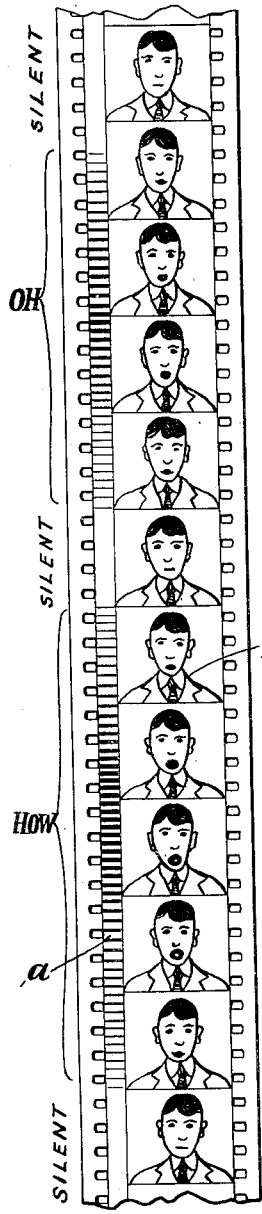
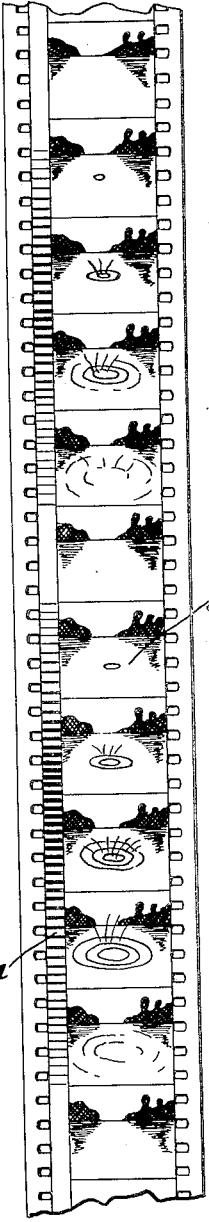
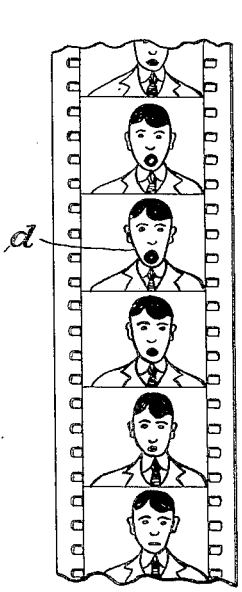
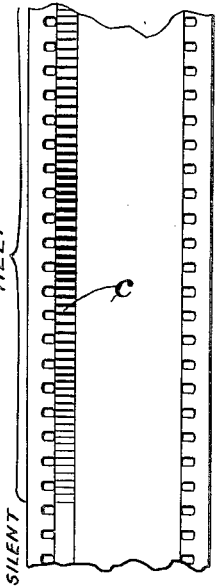
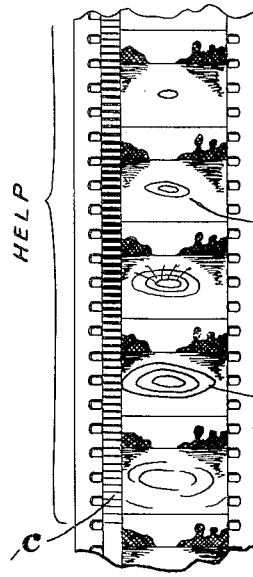
Inventor:
Max Fleischer,
By Spear, Middleton, Donaldson & Hall
Attys.

May 16, 1933.  M. FLEISCHER  1,909,339
SOUND SYNCHRONIZED ANIMATED DRAWING FILM AND PROCESS OF PRODUCING SAME
Filed July 23, 1930   2 Sheets-Sheet 2

Inventor:
Max Fleischer,
By Spear, Middleton, Donaldson & Hall
Attys.

Patented May 16, 1933

1,909,339

UNITED STATES PATENT OFFICE

MAX FLEISCHER, OF NEW YORK, N. Y.

SOUND SYNCHRONIZED ANIMATED DRAWING FILM AND PROCESS OF PRODUCING SAME

Application filed July 23, 1930. Serial No. 470,158.

The invention is a sound synchronized animated drawing film and process of producing the same.

An object of the invention is to produce absolute accuracy of synchronization of animated drawings with a sound record.

The invention involves the production of a series of animated drawings accurately synchronized with sound by means of analysis of the sound track of a previously produced sound record film.

The invention further involves producing a series of animated drawings accurately synchronized with sound, by means of measurement of the sound track of a previously produced sound record film to determine the beginning, duration, and ending of the sounds in terms of frames, or other appropriate unit of measurement, and by the aid thereof and apart from the sound record, or picture film, as may have been produced in synchronism therewith, or the projection of pictures, making the drawings, including in proper number and sequential relation drawings depicting actions appropriate to the sound recorded.

Pictures, if present on the film containing the sound track, may be used as the unit of measurement, but either when the pictures are on the film, or in the complete absence of pictures, a different unit of measurement may be employed for governing the artist, working wholly apart from the film, as to the number and sequential relation of the drawings required to accompany the sound record, or records.

In the accompanying drawings

Figure 1 is a view of a film with a sound track representing certain sounds with silent intervals. Motion pictures which were taken of the subject accompanying the sound are shown recorded on the same film.

Fig. 2 shows the final animated drawing or cartoon film synchronized with the same sound track.

Fig. 3 shows a film with a sound track for the sound Help.

Fig. 3a shows a film with the motion pictures of the person making the sound Help, the motion pictures being synchronized with the sound track of Fig. 3.

Fig. 4 is a view of the final animated drawing film showing ripples or waves accurately synchronized with the same sound track reproduced on the same film for convenience.

The final drawing film of Fig. 4 may be produced either by using the sound film of Fig. 3 alone, or with the assistance of the synchronized motion picture film of Fig. 3a.

Figure 5:
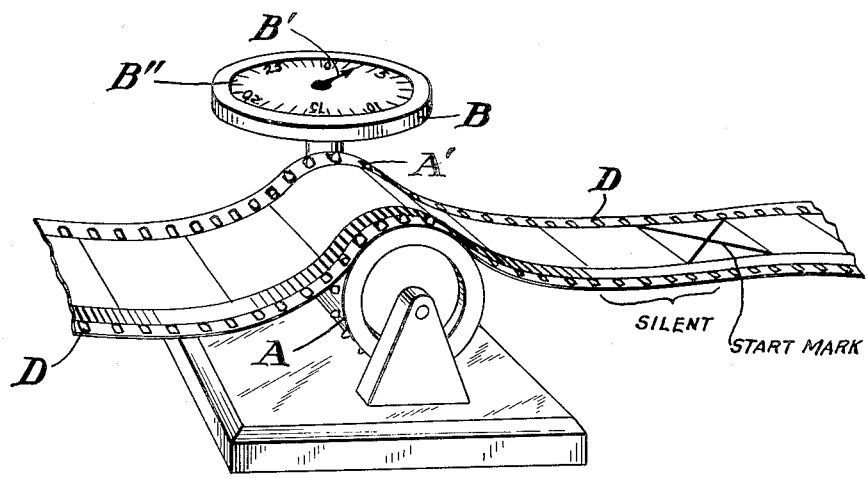
Figure 6:
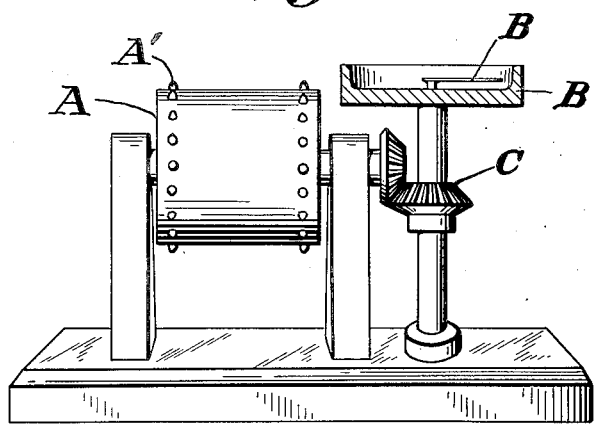

Figs. 5 and 6 are diagrammatic views of suitable apparatus for measurement of the sound track by the number of frames (four sprocket holes per frame).

In practicing the invention without the assistance of the motion pictures in analyzing the sound record, the sounds are produced with proper intervals after preparing an animated drawing scenario and determining the desired sounds to go with the desired action in the animate drawings, the sounds are recorded upon a film, and the film is run through a counter which counts the number of frames or drawings by four sprocket holes per frame. By the length of the sound track, the counter determines the number of frames for the particular sound. The scenario may call for no sound at the very start of the action. The duration of the silent portions or intervals between the sounds is determined from the scenario in the production of the sounds and the sound record film is run during the entire time and hence records the silent periods as well as the sounds in terms of four sprocket holes per frame. The counter would determine so many frames silent, then so many frames for the predetermined sound Oh, then a few frames silent, then so many frames for the sound How.

This information is given to the artist who makes his drawings accordingly, so many drawings (on sheets each about 8 inches by 11 inches) to be silent, so many drawings on these sheets to synchronize with the sound Oh, then several drawings to be without sound, then so many drawings for the sound How.

The drawings are photographed by a camera from above upon a film successively as they are completed.

The negative sound record and the negative of the drawings may then be reproduced upon a single film with the sound record spaced about 19 frames or 14½ inches from the corresponding drawings, as is customary. This may be done by placing the starting marks of the sound negative and animated drawing negative in registry, one over the other, then pulling up the sound film the desired number of spacing frames, and making a new negative and positive from the films thus held.

The sound record film is run during the time including sound and silent periods determined by the director from the scenario and the spaces of four sprockets each (corresponding to frames) are reeled off from the outset or starting point. Obviously the sound may commence in the middle or near or at either end of a particular space of four sprocket holes (or frame). The sound thus may fall where it will as to any particular frame. In running this sound record frame through the counter, the spaces of four sprockets each (corresponding to a frame) are counted from the beginning. The first space of four sprockets to have a substantial amount of sound track is counted as the first sound frame, which represents the first sound drawing. If the sound starts just at the end of a frame, it is counted as silent, and the next succeeding frame is counted as the first sound frame. It may be said that if a frame (space of four sprockets) has about a quarter or a third of its extent opposite a sound track, it may be regarded as a sound frame and a corresponding drawing is produced.

This produces absolute synchronization with respect to the human eye and ear since with the high speed of projection any variation within a single frame is impossible of detection.

It will be thus apparent that if motion pictures are taken in synchronization with the sound, the pictures will be of assistance in indicating the points of beginning and ending of the sounds in the making of the original drawings, altho absolute synchronization to the human eye and ear are produced without the assistance of the pictures as indicating means.

For example, if the sound record contains a record of the sound Help and a motion picture record had been synchronously made of the person crying Help, original drawings consisting simply of a pool of water with ripples according to the sound may be produced without regard to the motion pictures but simply by analysis of the sound track and counting of the sound frames. This will result in absolute synchronization such as has never been possible prior to applicant's invention.

With the assistance of the motion pictures of the subject crying Help, the pictures by their time of action may also help to indicate the beginning and ending of the sound Help on the sound track. The drawings of the ripples on the pool of water may be made accordingly.

In short, the method with the assistance of the pictures as indicating means with respect to the beginning and ending of the sound is desirable, but the method may be carried out to produce synchronization without the motion pictures.

In the accompanying figures the sound marks are shown opposite the corresponding picture for purposes of illustration of the invention. While in practice at the present time the sound is staggered about 19 frames or less with respect to the picture as is well known, the relation is the same as if they were directly opposite as shown on the accompanying drawing. The drawing in Fig. 1 shows the film with a sound track $a$ representing the sounds Oh and How with silent intervals, and shows that the sound may begin or end intermediate of a frame or group of four sprocket holes. The accompanying motion pictures $b$ are shown opposite the sound track. The drawing is purely illustrative and diagrammatic and the silent interval between the sounds Oh and How may consist of a plurality of frames. This drawing shows that the position of the lips of the person in the motion pictures, beginning to say Oh will assist in the analysis of the beginning of the sound in making the original drawings which may show a piano or box opening its lid and saying Oh, or which may simply show a pool of water with ripples as indicated in the final animated drawing film $f$ of Fig. 2.

Fig. 3 shows a film provided with a sound track $c$ of the sound Help, while Fig. 3$a$ shows a film with a motion picture record $d$ of the person crying Help.

Fig. 4 shows the final animated drawing film of a body of water with ripples or waves accurately synchronized with the same sound track.

The sound track $c$ of Fig. 4 may be on a separate film from the final animated drawing film with which it is synchronized but for purposes of projection it is convenient to have the sound track reproduced on the same film with the synchronized animated drawings as shown in Fig. 4. The final product shown in Fig. 4 with its series of original drawings $e$ may be produced by using the sound film alone, or it may be produced with the assistance of the motion pictures $d$ of Fig. 3$a$, all as hereinbefore set forth.

Suitable apparatus for measurement of the sound track and silent portions of the film by the number of frames (four sprocket holes per frame) is shown diagrammatically in Figs. 5 and 6 in which a sprocket roller A is geared to a counter device B as by bevel gears C. The film passes over the sprocket roller A with its sprocket holes D in mesh with the sprocket teeth A'. A rider may be provided to hold the film against the sprocket roller.

The counter device B may be provided with suitable pointer means B' and suitable indicia B'', and may be capable, for instance, of counting 16 frames in one revolution of the pointer which is about one foot of film. The dial in the drawing is capable of counting 30 frames in one revolution.

As shown in Fig. 5 the counting is effected from the start mark X on the film whether the sound record starts immediately or not. For example, the scenario may call for animated drawings without sound for a number of frames, and so the silent portion is measured so that the drawings may be made one for each frame of the silent portion. There may be say, 8 frames of the silent portion followed by a sound track portion for the sound such as How which may comprise more or less frames according to whether it is spoken or sung. There may be say, 32 frames for the sound How and the artist accordingly makes 32 original drawings to accompany the sound and to provide any action that his judgment and originality may dictate.

This invention thus involves the production of original drawings by analysis of the previously produced sound with or without the supplementary assistance of the motion pictures of the subject accompanying the sound.

I claim:

1. The process of securing synchronization of animated drawings with a sound record which includes determining the desired sequence of sounds to be produced with animated drawings, producing the predetermined sounds in prescribed sequence, making a record of the sounds so produced, analyzing and noting the time elements of the sequential sound record as to beginning, duration, and ending of the individual sounds, making a series of drawings having appropriate relation to the sequential sounds, said drawings individually corresponding in time in respect to the action depicted by them with the time of the appropriate sounds of the sequential series as to beginning, duration, and ending, and reproducing said drawings on a film in synchronization with the sound record.

2. The process of securing synchronization of animated drawings with a sound record, which includes determining the character of the sounds to be produced and the sequence of said sounds, producing said sounds of the chosen character, and in the prescribed sequence, making a record of the said sounds by frames, measuring the record as to the beginning, duration and ending of the individual lengths of sounds by frames, making a series of drawings having appropriate relation to the particular sound with which they are to be projected, and corresponding in frame measure, in respect to the action depicted by them, with the frame measurements of the appropriate sound as to beginning, duration and ending, and reproducing said drawings photographically on a film, whereby said drawings, when projected, will synchronize with the proper projected sounds.

3. The process of producing a film containing a series of pictures photographically reproduced from drawings portraying a story to be accompanied by reproduced sound appropriate to the action shown in the drawings, and containing a sound record arranged in properly timed relation to the pictures, including the steps of determining upon a scenario and also the desired sequence of sounds to go with the animated drawings of said scenario, producing the desired sounds in the prescribed sequence, making a record of said sounds by frames, measuring the record as to the beginning, duration and ending of the individual lengths of sounds by said frames alone, i. e. without the assistance of motion pictures taken simultaneously with the sound, making a series of drawings having appropriate relation to the particular sound with which they are to be projected, and corresponding in frame measure in respect to the action depicted by them, with the frame measurements of the appropriate sound as to beginning, duration and ending, and reproducing said drawings photographically on a film, whereby said drawings, when projected, will synchronize with the proper projected sounds.

In testimony whereof, I affix my signature.

MAX FLEISCHER.